United States Patent
Hoshino et al.

(10) Patent No.: US 8,363,518 B2
(45) Date of Patent: Jan. 29, 2013

(54) DISK DRIVE

(75) Inventors: Hiroshi Hoshino, Tokyo (JP); Akira Kitada, Tokyo (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 13/574,539

(22) PCT Filed: Feb. 25, 2010

(86) PCT No.: PCT/JP2010/001279
§ 371 (c)(1),
(2), (4) Date: Jul. 20, 2012

(87) PCT Pub. No.: WO2011/104756
PCT Pub. Date: Sep. 1, 2011

(65) Prior Publication Data
US 2012/0300604 A1   Nov. 29, 2012

(51) Int. Cl.
*G11B 7/00* (2006.01)
(52) U.S. Cl. ............ 369/44.32; 369/44.28; 369/44.25; 369/53.14
(58) Field of Classification Search .................. None
See application file for complete search history.

(56) References Cited

U.S. PATENT DOCUMENTS

| | | | |
|---|---|---|---|
| 8,023,377 B2 * | 9/2011 | Aihara et al. | 369/53.14 |
| 8,169,867 B2 * | 5/2012 | Fujita | 369/53.14 |

FOREIGN PATENT DOCUMENTS

| | | |
|---|---|---|
| JP | 2000-20965 A | 1/2000 |
| JP | 2008-33977 A | 2/2008 |
| JP | 2008-33978 A | 2/2008 |
| JP | 2008-176863 A | 7/2008 |
| JP | 2008-269662 A | 11/2008 |

* cited by examiner

*Primary Examiner* — Muhammad N Edun
(74) *Attorney, Agent, or Firm* — Birch, Stewart, Kolasch & Birch, LLP

(57) ABSTRACT

A disk drive determines, from eccentric amounts of individual prescribed rotation phases for one round of an optical disk 1, a rotation phase range in which a lens shift amount after tracking pulling-in of an object lens constituting an optical pickup 3 does not exceed a movable range of the object lens in a preset tracking direction, sets the rotation phase range as a tracking pulling-in range, and carries out tracking pulling-in of the optical pickup 3 while the rotation phase of the optical disk 1 is placed within the tracking pulling-in range.

4 Claims, 16 Drawing Sheets

FIG.4
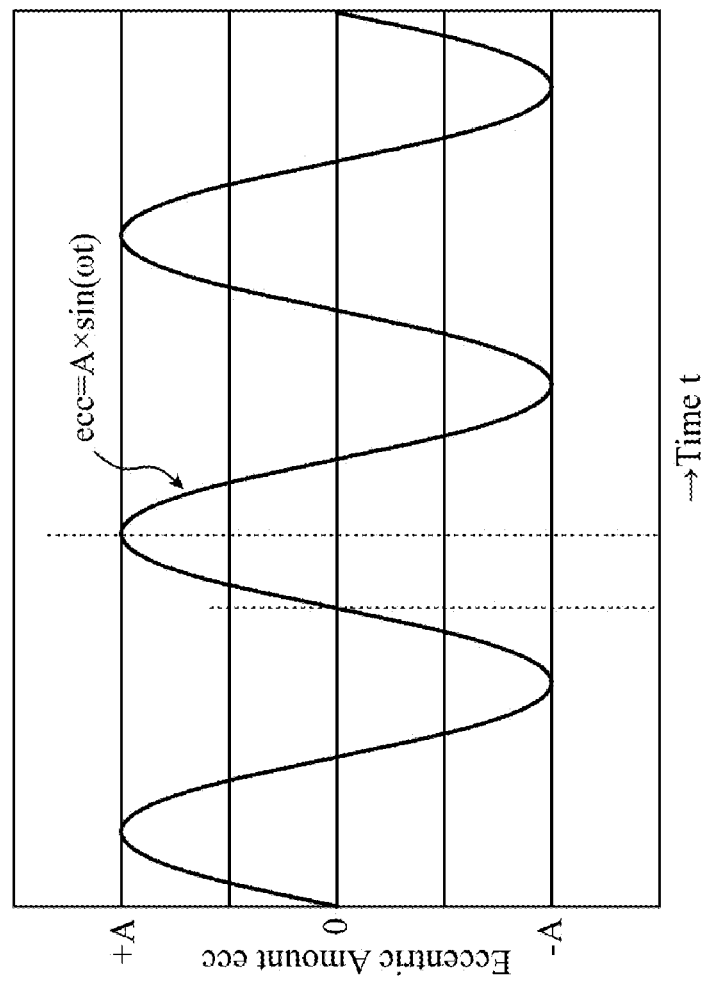
Eccentric Amount and Time
$ecc = A \times \sin(\omega t)$
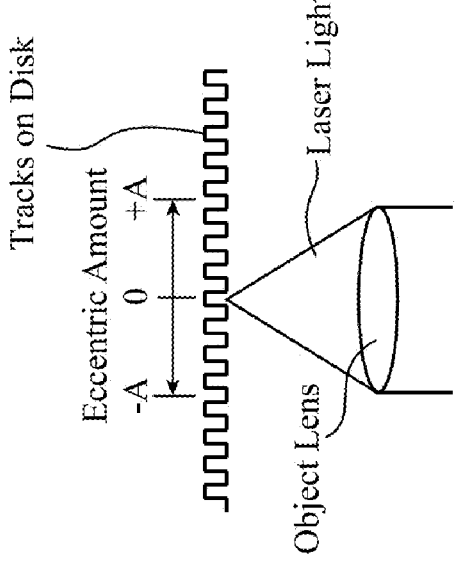

FIG.5
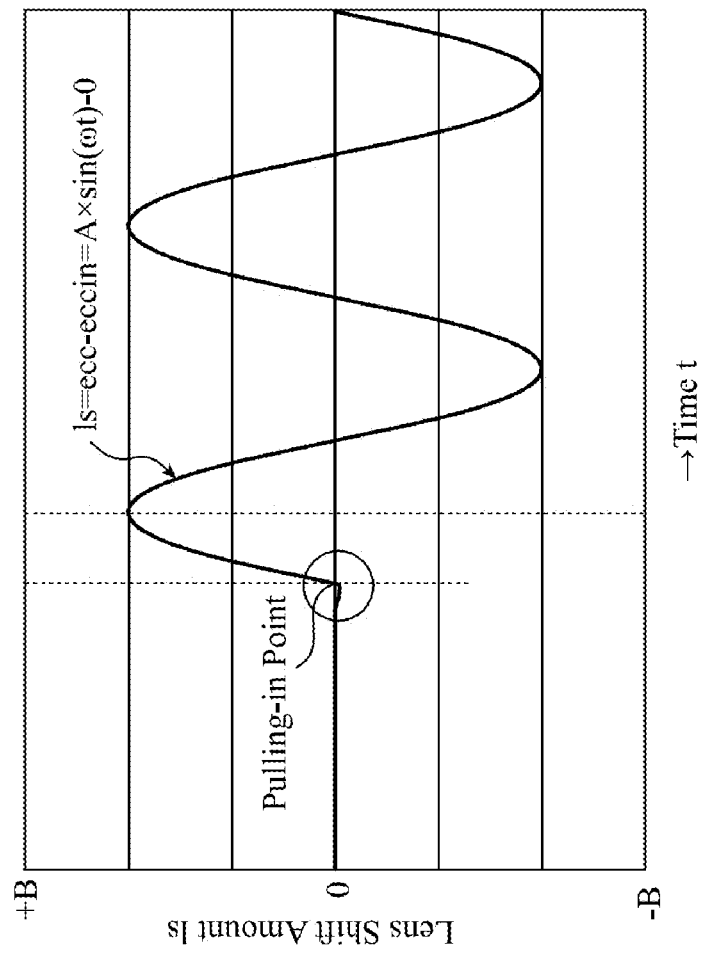
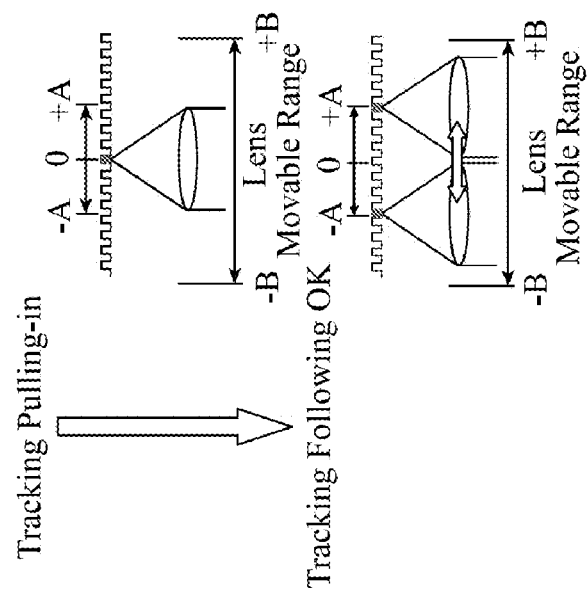

FIG.6
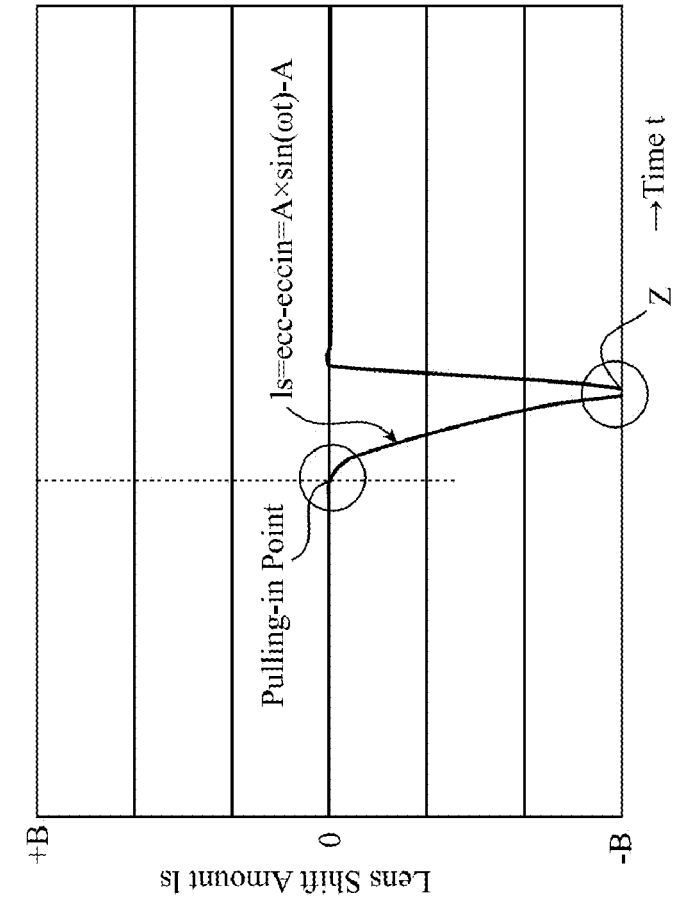
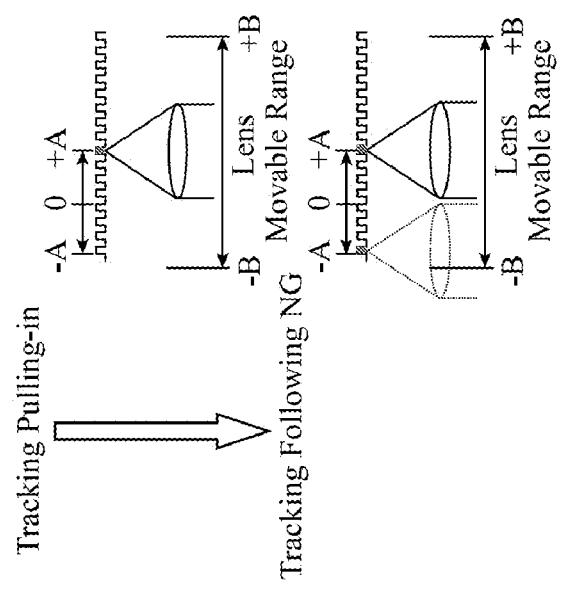

DISK DRIVE

TECHNICAL FIELD

The present invention relates to a disk drive capable of compensating for a cyclic displacement due to eccentricity of a disk.

BACKGROUND ART

As for eccentric follow-up control for compensating for the cyclic displacement due to eccentricity of a disk, there are a method of causing an optical pickup itself to follow and a method of causing only an object lens to follow with a tracking actuator. Since the method of causing the optical pickup itself to follow has a greater amount of movement of a carriage as compared with the method of causing only the object lens to follow, the life of its components becomes shorter. In addition, when causing the optical pickup to follow, since disturbance such as vibration is apt to occur, it is feared that there will be some effect on a focus servo and tracking servo. Accordingly, the method of causing only the object lens to follow is employs in general.

For example, a tracking control device disclosed in Patent Document 1 improves trackability to eccentricity by measuring the eccentric amount using a meander signal component (wobble component) of a track and by obtaining an eccentric correction drive signal by passing the resultant eccentric amount through a filter with characteristics reverse to the tracking transfer characteristics.

The device of the Patent Document 1, however, does not consider relationships between a tracking pulling-in position and the movable range of the object lens. Accordingly, depending on the tracking pulling-in position, it has a problem in that the lens drive amount due to the eccentricity exceeds the lens movable range and hence a state of being unable to maintain the tracking can occur.

The present invention is implemented to solve the foregoing problems. Therefore it is an object of the present invention to provide a disk drive capable of improving the tracking maintenance capability for a disk with an eccentric component.

PRIOR ART DOCUMENT

Patent Document

Patent Document 1: Japanese Patent Laid-Open No. 2000-20965.

DISCLOSURE OF THE INVENTION

A disk drive in accordance with the present invention comprises a rotation phase detecting unit for detecting a rotation phase of an optical disk; an eccentric amount detecting unit for detecting an eccentric amount of the optical disk for each prescribed rotation phase detected by the rotation phase detecting unit; a storage unit for storing, for individual prescribed rotation phases, the eccentric amounts for one round of the optical disk detected by the eccentric amount detecting unit; a setting unit for determining, from the eccentric amounts for individual prescribed rotation phases for one round of the optical disk read out of the storage unit, a rotation phase range in which a lens shift amount after tracking pulling-in of an object lens constituting the optical pickup does not exceed a movable range of the object lens in a preset tracking direction, and for setting the rotation phase range as a tracking pulling-in range; and a control unit for carrying out tracking pulling-in of the optical pickup while the rotation phase of the optical disk detected by the rotation phase detecting unit is placed within the tracking pulling-in range set by the setting unit, wherein the disk drive can maximize pulling-in capability for eccentricity even in initial tracking pulling-in.

According to the present invention, it determines, from the eccentric amounts for individual prescribed rotation phases for one round of the optical disk, a rotation phase range in which a lens shift amount after tracking pulling-in of an object lens constituting the optical pickup does not exceed a movable range of the object lens in a preset tracking direction, and sets the rotation phase range as a tracking pulling-in range, and carries out tracking pulling-in of the optical pickup while the rotation phase of the optical disk is placed within the tracking pulling-in range. The configuration offers an advantage of being able to improve the tracking maintenance capability for a disk with an eccentric component.

BRIEF DESCRIPTION OF THE DRAWINGS

FIG. 2 is a diagram showing signals necessary for tracking pulling-in;

FIG. 4 is a diagram showing relationships between the eccentric amount and time when rotating an optical disk with the maximum eccentric amount A at angular velocity ω;

FIG. 5 is a diagram showing relationships between the lens shift amount and time when pulling-in tracking at a position where the eccentric amount is zero when the maximum eccentric amount A is less than a lens movable range B;

FIG. 6 is a diagram showing relationships between the lens shift amount and time when pulling-in tracking at a position where the eccentric amount is maximum when the maximum eccentric amount A is less than a lens movable range B;

FIG. 14 is a diagram showing relationships between the eccentric amount A7 and the average eccentric amount A6 with respect to the rotation phase when a lens shift occurs at the tracking pulling-in;

EMBODIMENTS FOR CARRYING OUT THE INVENTION

The best mode for carrying out the invention will now be described with reference to the accompanying drawings to explain the present invention in more detail.

Embodiment 1

Figure 1:
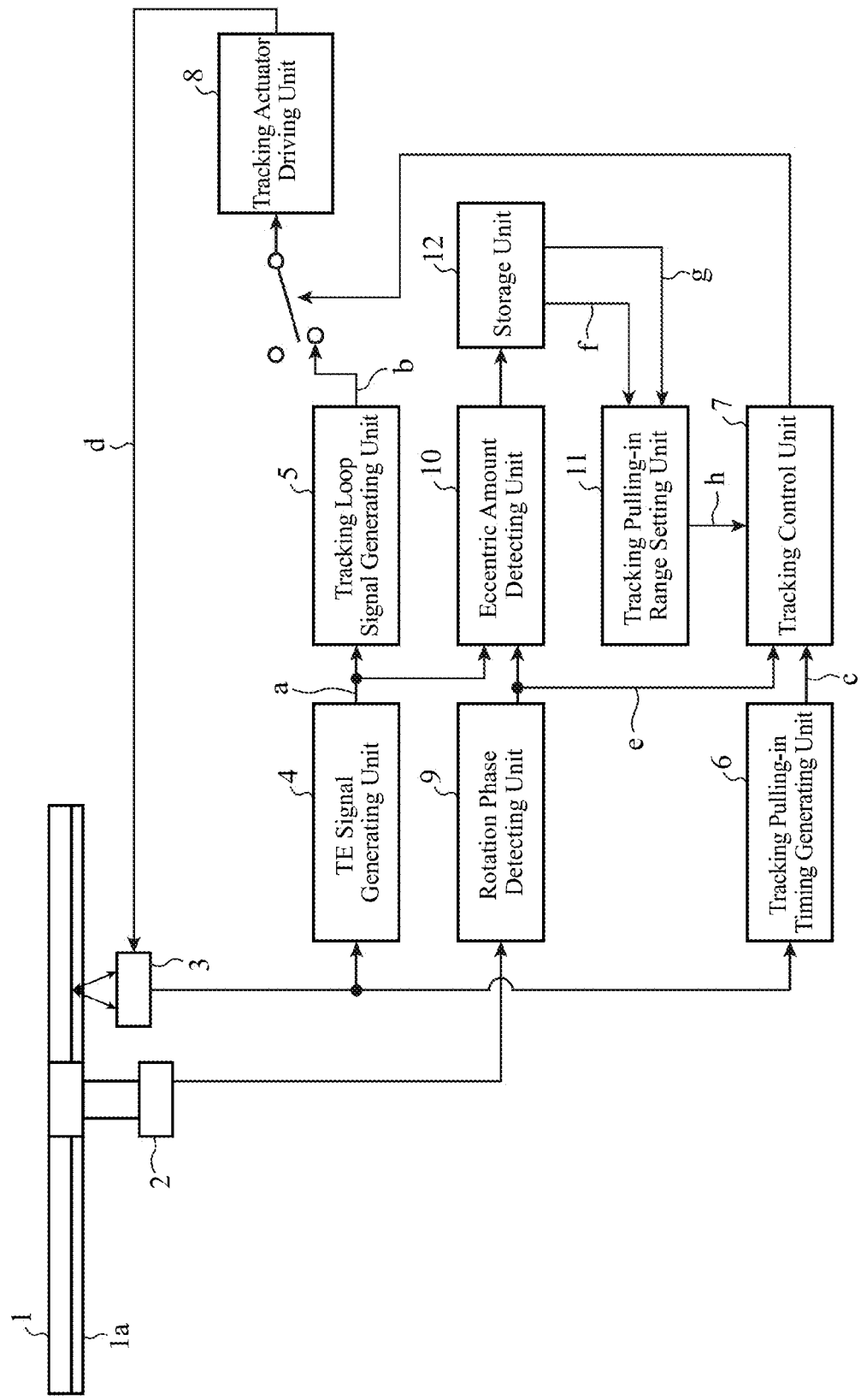
FIG. 1 is a block diagram showing a configuration of a disk drive of an embodiment 1 in accordance with the present invention.

FIG. 1 is a block diagram showing a configuration of a disk drive of an embodiment 1 in accordance with the present invention. In FIG. 1, the disk drive of the embodiment 1 comprises a disk rotation unit 2, an optical pickup 3, a TE signal generating unit 4, a tracking loop signal generating unit 5, a tracking pulling-in timing generating unit 6, a tracking control unit 7, a tracking actuator driving unit 8, a rotation phase detecting unit 9, an eccentric amount detecting unit 10, a tracking pulling-in range setting unit 11 and a storage unit 12.

The disk rotation unit 2 is a component for rotating an optical disk 1. The optical pickup 3 is a component for gathering and concentrating laser light onto the information surface of the optical disk 1 rotated by the disk rotation unit 2, and for detecting its reflected light. The TE signal generating unit 4 is a component connected to the optical pickup 3 and generates a tracking error signal a (referred to as a "TE signal a" from now on) used for tracking control from a signal corresponding to the reflected light obtained with the optical pickup 3. The TE signal a is a signal indicating a shift of the laser spot from the correct tracking position on the optical disk 1.

The tracking loop signal generating unit 5 is a component connected to the TE signal generating unit 4 and generates a tracking loop signal b from the TE signal a obtained by the TE signal generating unit 4. The tracking loop signal b is a signal for controlling the operation of the tracking actuator driving unit 8. The tracking pulling-in timing generating unit 6 is a component connected to the optical pickup 3 and generates a tracking pulling-in timing signal c from the signal corresponding to the reflected light obtained with the optical pickup 3.

The tracking control unit 7 is a component connected to the tracking pulling-in timing generating unit 6, rotation phase detecting unit 9 and tracking pulling-in range setting unit 11, and pulls in the tracking by closing a tracking servo loop in response to the tracking pulling-in timing signal c, rotation phase signal e and disk rotation phase range h.

Figure 2:
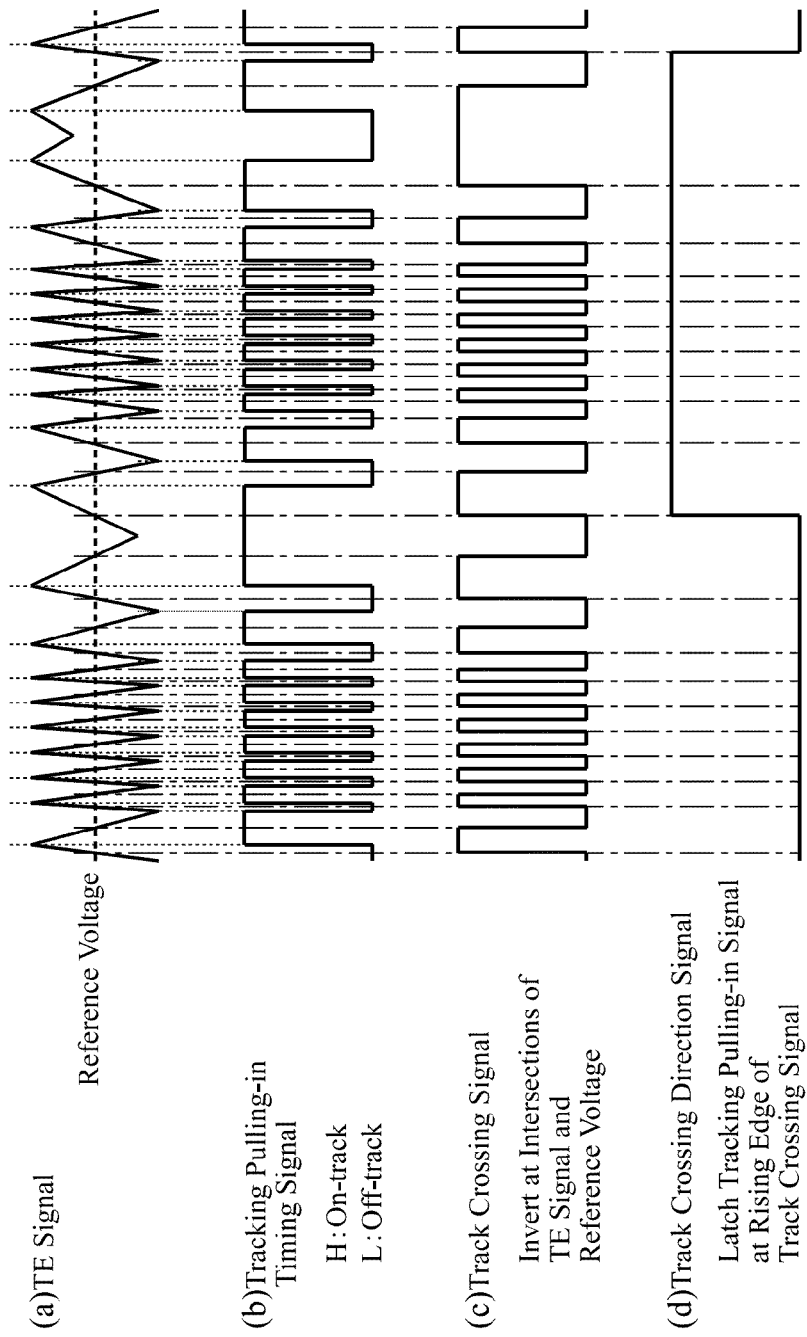

FIG. 2 is a diagram showing signals required for the tracking pulling-in. As shown in FIG. 2(b), the tracking pulling-in timing signal c is a signal indicating two states of on-track and off-track. Tracking pulling-in is carried out by controlling in such a manner as to close the tracking servo loop in an on-track state and to open the tracking servo loop in an off-track state, for example, in response to the tracking pulling-in timing signal c.

When maintaining the laser spot on a pit string (track) on the optical disk 1, the tracking loop signal b is supplied to the tracking actuator driving unit 8. The tracking actuator driving unit 8 generates the tracking drive signal d in response to the tracking loop signal b. The tracking actuator in the optical pickup 3 is driven in response to the tracking drive signal d received, and maintains the state (trace state) in which the laser spot is placed on the track. The loop of such a signal is referred to as a tracking servo loop.

Figure 3:
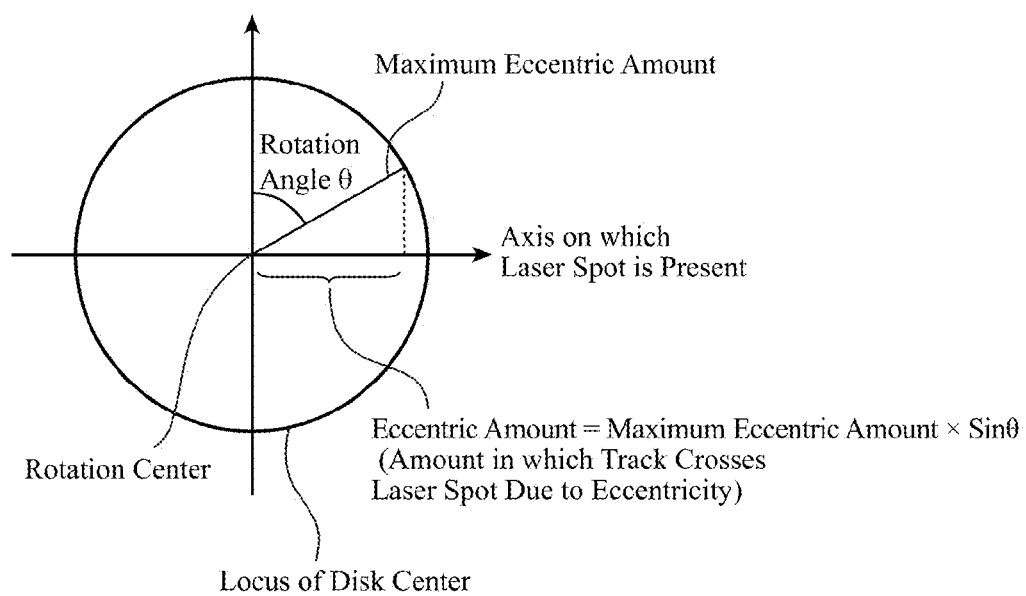
FIG. 3 is a diagram showing relationships between the central position of concentric tracks recorded on an optical disk and the central position of rotation of the optical disk.

FIG. 3 is a diagram showing relationships between the central position of the concentric tracks recorded on the optical disk and the central position of the rotation of the optical disk. In the following, the quantity indicating the difference between the central position of the concentric tracks recorded on the optical disk and the central position of the rotation of the optical disk 1 is referred to as the maximum eccentric amount as shown in FIG. 3. In addition, as shown in FIG. 3, when the optical disk 1 rotates at a particular rotation phase θ, a track crosses the laser spot by the amount (maximum eccentric amount×sin θ). The quantity will be referred to as an eccentric amount.

In addition, when the tracking servo loop is in the open state, if there is no disturbance other than the eccentricity, the laser spot crosses the tracks on the optical disk 1 by the amount corresponding to the eccentric amount. In this case, assuming that the number of crossed tracks corresponding to a single rotation of the disk 1 is α and the track pitch is β, then the maximum eccentric amount is given by (α×β)/4.

Here, the problem to be solved by the present invention will be described in detail.

FIG. 4 is a diagram showing relationships between the eccentric amount and time when rotating an optical disk with the maximum eccentric amount A with an angular velocity w. As shown in FIG. 4, the eccentric amount varies in synchronism with the rotation of the optical disk 1, and the eccentric amount ecc at time t is given by ecc=A×sin (ωt).

Here, supposing the optical pickup 3 whose lens movable range in the tracking direction (movable range of the tracking actuator) is B, then when A>B, the lens shift amount ls after the tracking pulling-in is given by ls=A×sin(ωt)−eccin, where eccin is the eccentric amount at the pulling-in. Accordingly, regardless of the value of eccin, that is, irrespective of the position where the tracking pulling-in is made, the lens shift amount ls exceeds the lens movable range B. Accordingly, the lens shift amount ls exceeds the lens movable range B at the time when following the eccentricity, thereby being unable to maintain the tracking.

On the other hand, FIG. 5 is a diagram showing relationships between the lens shift amount and time when the maximum eccentric amount A is less than the lens movable range B and when the tracking pulling-in is made at the position where the eccentric amount is zero, that is, where eccin=0. As shown in FIG. 5, when the tracking pulling-in is made at the position where the eccentric amount is zero, the lens shift amount ls after the tracking pulling-in is equal to the eccentric amount ecc and is given by ls=A×sin(ωt), and the tracking can be maintained. However, there are some cases where the tracking cannot be maintained even if A<B as shown below.

FIG. 6 is a diagram showing relationships between the lens shift amount and time when the maximum eccentric amount A is less than the lens movable range B and when the tracking pulling-in is made at the position where the eccentric amount is maximum, that is, where eccin=A. As shown in FIG. 6, when pulling the tracking in at the position where the eccentric amount is maximum, the lens shift amount ls after the tracking pulling-in is given by $ls=A\times\sin(\omega t)-A<-B$, which shows that the tracking cannot be maintained. Thus, the eccentric amount that enables maintaining tracking irrespective of the position where the tracking pulling-in is made must satisfy the relationship $2A<B$.

In addition, when the object lens vibrates because of disturbance or the like, the lens shift amount after the tracking pulling-in is given by $ls=A\times\sin(\omega t)-(eccin+lsin)$, where lsin is a shift amount from the lens neutral position at the tracking pulling-in. Accordingly, the eccentric amount that enables maintaining the tracking is further reduced.

In addition, the physical movable range of the object lens in the tracking direction reduces with recent miniaturization of the optical pickup unit (PU). Besides, accompanying the high-speed drive, unbalanced vibrations become large and the vibration amount of the object lens at the tracking pulling-in increases. Accordingly, the eccentric amount that enables maintaining the tracking has a tendency to reduce further.

Taking account of this, the disk drive in accordance with the present invention comprises the rotation phase detecting unit 9, eccentric amount detecting unit 10, tracking pulling-in range setting unit 11 and storage unit 12 as shown in FIG. 1, thereby improving the tracking maintenance capability for the optical disk 1 having an eccentric component.

The rotation phase detecting unit 9 is a component for detecting the rotation phase of the optical disk 1 from the signal in synchronism with the rotation of the optical disk 1, which is output from the disk rotation unit 2.

The eccentric amount detecting unit 10 is a component connected to the TE signal generating unit 4 and rotation phase detecting unit 9, and detects the eccentric amount of the optical disk 1 from the TE signal a obtained by the TE signal generating unit 4 and the rotation phase signal e obtained by the rotation phase detecting unit 9. The eccentric amount detected for each rotation phase by the eccentric amount detecting unit 10 is stored in the storage unit 12.

The tracking pulling-in range setting unit 11, which is a component capable of reading the data stored in the storage unit 12, reads from the storage unit 12 an eccentric amount signal f indicating the eccentric amount and disk rotation phase information g indicating the rotation phase at which the eccentric amount is detected, and sets the tracking pulling-in range from the eccentric amount for each rotation phase.

Next, the operation will be described.

First, the number of crossed tracks can be detected by counting edges of a track crossing signal as shown in FIG. 2(c). Incidentally, the track crossing signal is a signal inverted every time the TE signal a crosses a reference voltage.

Here, by dividing the single rotation of the disk into n portions in the circumferential direction and by counting the number of crossed tracks during the rotation of 360/n degrees (referred to as γ degrees, from now on) of the optical disk 1, the average number of crossed tracks within a sector (γ degrees) in the disk circumferential direction can be obtained.

The rotation phase detecting unit 9 detects the rotation phase of the optical disk 1 and outputs the rotation phase signal e.

The eccentric amount detecting unit 10, when receiving the TE signal a from the TE signal generating unit 4 and the rotation phase signal e from the rotation phase detecting unit 9, detects the average number of crossed tracks by counting the number of crossed tracks every time the optical disk 1 rotates γ degrees in the state where the disk rotation is constant and the tracking drive signal d is zero, that is, the lens shift amount ls is zero, and converts the resultant average number of crossed tracks for the single rotation of the disk into the average eccentric amount.

The present embodiment 1 employs the following method to convert the average number of crossed tracks to the average eccentric amount.

Figure 7:
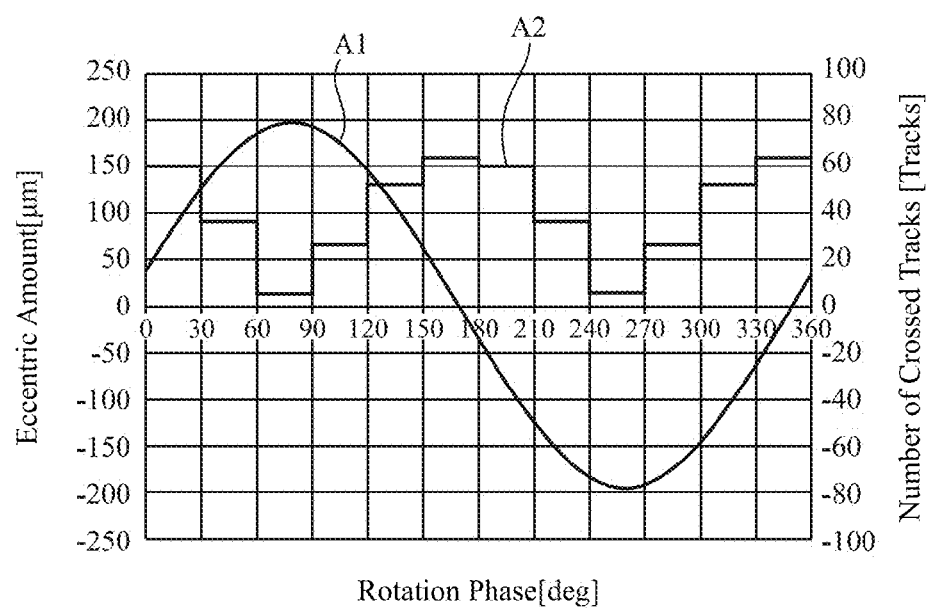
FIG. 7 is a diagram showing relationships between the eccentric amount A1 for a single rotation of a disk and the number of crossed tracks A2 detected for each rotation phase when dividing the single rotation of the disk into 12 sectors in the circumferential direction.

FIG. 7 is a diagram showing relationships between the eccentric amount A1 for a single rotation of a disk and the number of crossed tracks A2 detected for each rotation phase when dividing the single rotation of the disk into 12 portions in the circumferential direction. FIG. 7 shows the eccentric amount A1 and the number of crossed tracks A2 which are obtained when the maximum eccentric amount is 200 μm and the optical disk 1 with a track pitch of 1.6 μm is rotated at a fixed rotation speed. As shown in FIG. 7, the number of crossed tracks A2 is always positive regardless of the positive or negative value of the eccentric amount A1.

Figure 8:
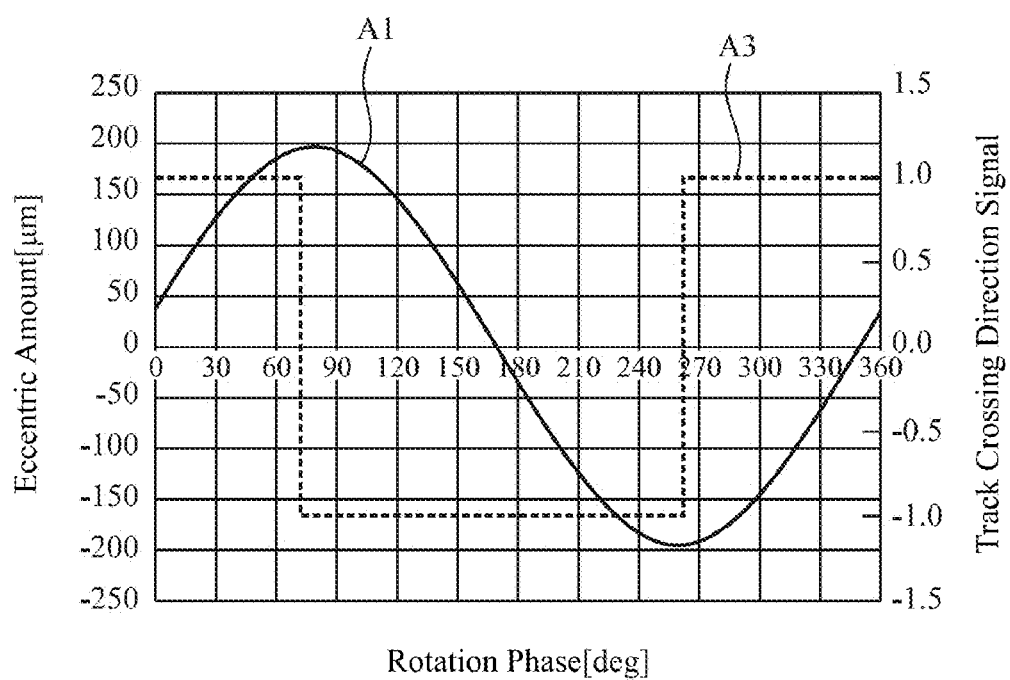
FIG. 8 is a diagram showing relationships between the eccentric amount A1 for a single rotation of a disk and the track crossing direction signal A3 shown in FIG. 2(d)
Figure 9:
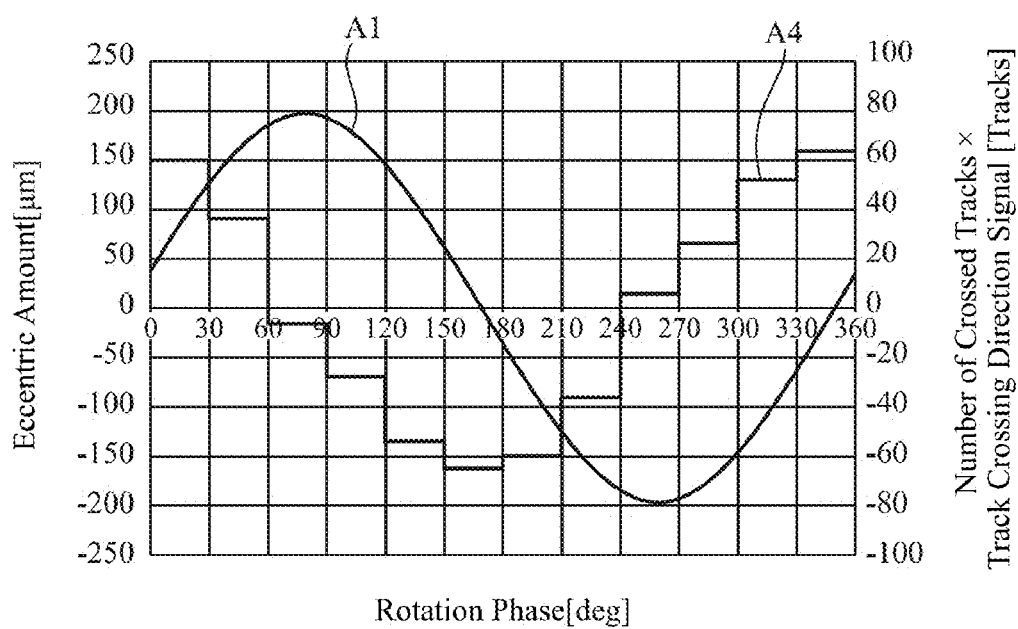
FIG. 9 is a diagram showing relationships between the eccentric amount A1 for a single rotation of a disk and a value A4 obtained by multiplying the track crossing direction signal shown in FIG. 2(d) by the number of crossed tracks A2 detected for each rotation phase shown in FIG. 7.

FIG. 8 is a diagram showing relationships between the eccentric amount A1 for a single rotation of a disk and the track crossing direction signal A3 shown in FIG. 2(d). FIG. 9 is a diagram showing relationships between the eccentric amount A1 for a single rotation of a disk and a value A4 obtained by multiplying the track crossing direction signal A3 shown in FIG. 2(d) by the number of crossed tracks A2 detected for each rotation phase shown in FIG. 7.

As shown in FIGS. 8 and 9, the value A4 obtained by multiplying the number of crossed tracks A2 by the track crossing direction signal A3 shows a track crossing speed if the disk rotation is constant, and has a phase that leads the eccentric amount A1 by 90 degrees.

Figure 10:
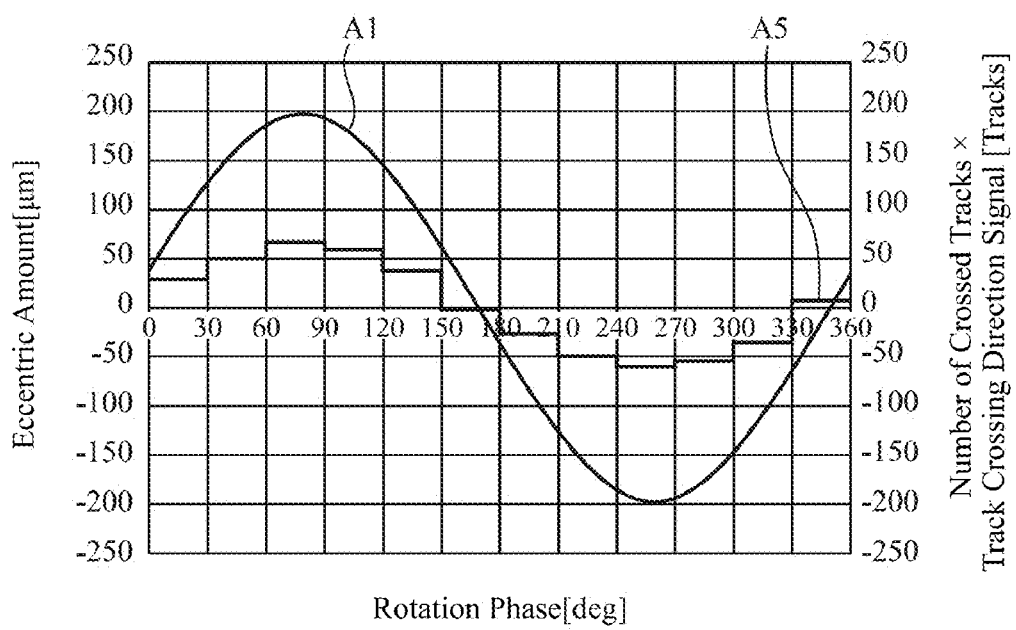
FIG. 10 is a diagram showing relationships between the eccentric amount A1 for a single rotation of a disk and a value A5 obtained by shifting the rotation phase of the value A4 in FIG. 9 by 90 degrees.

FIG. 10 is a diagram showing relationships between the eccentric amount A1 for a single rotation of a disk and a value A5 obtained by shifting the rotation phase of the value A4 in FIG. 9 by 90 degrees. The number of crossed tracks A2 is detected per rotation phase (per γ degrees), and a storage area corresponding to each rotation phase is assigned in the storage unit 12. The value A4 obtained by multiplying the number of crossed tracks A2 by the track crossing direction signal A3 has a phase that leads the eccentric amount A1 by 90 degrees.

Accordingly, the rotation phase in the storage area, to which the number of crossed tracks A2 is assigned in the storage unit 12, is shifted by 90 degrees. This will enable obtaining the information A5 with the same phase as the eccentric amount A1 as shown in FIG. 10.

Figure 11:
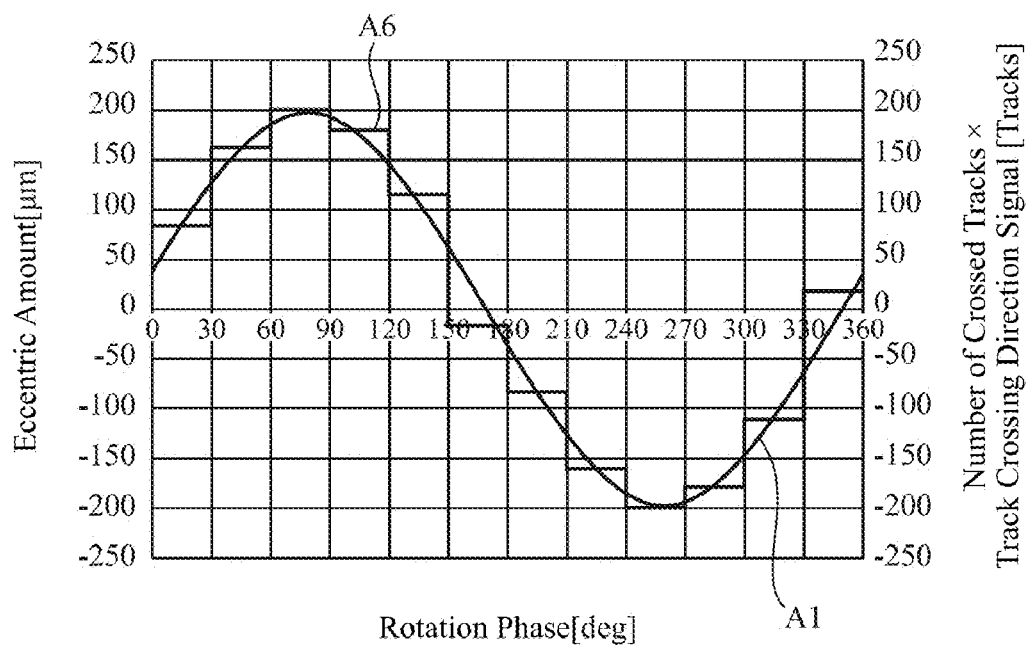
FIG. 11 is a diagram showing relationships between the eccentric amount A1 for a single rotation of a disk and a value A6 passing through amplitude correction carried out in such a manner that the maximum value of the information A5 in FIG. 10 becomes maximum eccentric amount.

In addition, the maximum eccentric amount is obtained by summing up the number of crossed tracks for one round, followed by multiplying the result by the track pitch β and by dividing the product by four. Accordingly, the average eccentric amount A6 as shown in FIG. 11 is obtained by carrying out amplitude correction in such a manner that the maximum value of the information A5 shown in FIG. 10 becomes the maximum eccentric amount.

The storage unit 12 has n storage areas (storage areas per γ degrees) equal to the number of divisions for the single rotation of the disk, and the individual storage areas are assigned numbers 1 to n, for example.

The eccentric amount detecting unit 10, when having obtained the average eccentric amount A6 for each γ degrees as described above, stores the resultant average eccentric amount A6 for each γ degrees in the storage area corresponding to each γ degrees in the storage unit 12.

As for the average eccentric amount A6, the tracking pulling-in range setting unit 11 reads it out of the storage unit 12 as the eccentric amount signal f.

The tracking pulling-in range setting unit 11 reads from the storage unit 12 the eccentric amount signal f for one round of the disk 1 and the storage area number corresponding to it, that is, the disk rotation phase information g, and calculates a disk rotation phase range h in which the lens shift amount ls after the tracking pulling-in does not exceed a preset movable range of the tracking actuator. A concrete calculating method thereof will be described below.

Assume that the maximum eccentric amount is A and the eccentric amount at the tracking pulling-in is eccin, then the lens shift amount ls after the tracking pulling-in is given by ls=A×sin(ωt)−eccin, and its maximum value is given by A+|eccin|.

Consequently, if the tracking actuator movable range (the lens movable range of the object lens) is ±B, the range of |eccin| to be satisfied is |eccin|<B−A.

However, since the eccentric amount signal f is the average eccentric amount in the corresponding storage area, that is, in the corresponding disk rotation phase range, even if the average eccentric amount is within the range of |eccin|, there are some cases where the maximum eccentric amount A within the disk rotation phase does not fit into the range of |eccin|.

Figure 12:
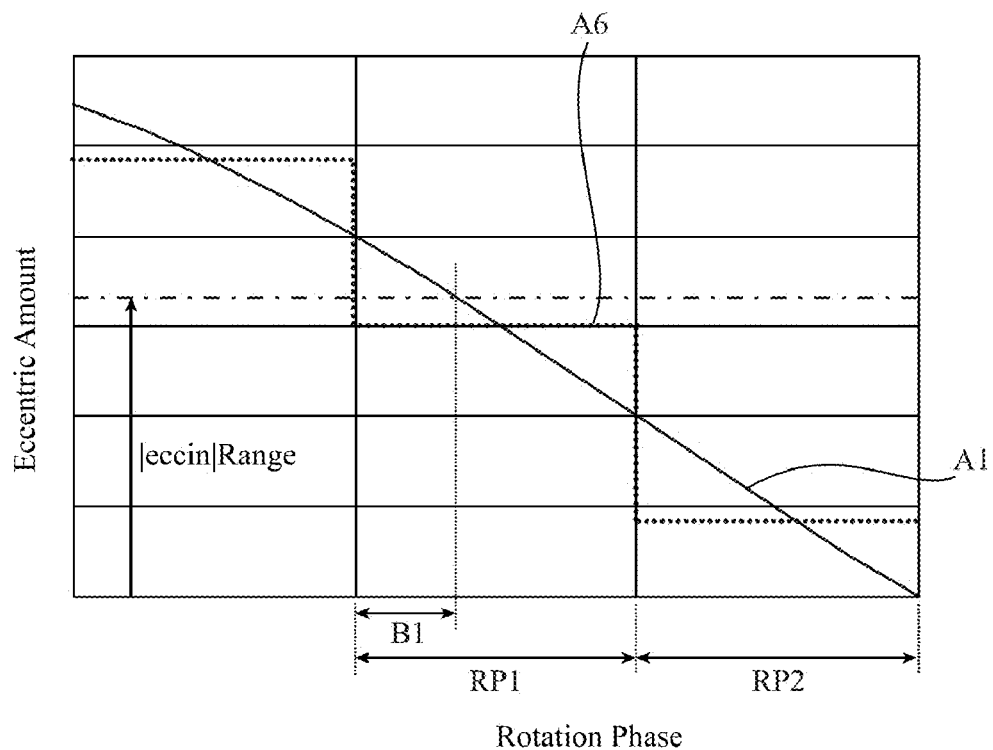
FIG. 12 is a diagram showing relationships between the eccentric amount A1 and an average eccentric amount A6 with respect to a rotation phase.

FIG. 12 is a diagram showing relationships between the eccentric amount A1 and the average eccentric amount A6 with respect to the rotation phase: a solid line shows the eccentric amount A1, a broken line shows the average eccentric amount A6, and a dash dotted line shows the range of the absolute value |eccin| of the eccentric amount at the tracking pulling-in. As shown in FIG. 12, the average eccentric amount of a rotation phase RP1 is the maximum average eccentric amount that fits into |eccin|. However, in an angle range B1, the eccentric amount exceeds |eccin| even if it belongs to the range of the rotation phase RP1.

Accordingly, when the range |eccin| is obtained, the tracking pulling-in range setting unit 11 sets, in the tracking control unit 7 as the tracking pulling-in range, a disk rotation phase range h corresponding to a rotation phase RP2, that is, the disk rotation phase range corresponding the storage area, the number of which is less by one with respect to the resultant range |eccin| in the storage unit 12.

Only when the rotation phase signal e received from the rotation phase detecting unit 9 is within the disk rotation phase range h, the tracking control unit 7 carries out control of closing the tracking loop in accordance with the tracking pulling-in timing signal c output from the tracking pulling-in timing generating unit 6.

As described above, according to the present embodiment 1, it determines the rotation phase range in which the lens shift amount after the tracking pulling-in of the object lens constituting the optical pickup 3 does not exceed the movable range ±B of the object lens in the preset tracking direction on the basis of the eccentric amount for each prescribed rotation phase for one round of the optical disk 1, sets it as a tracking pulling-in range, and carries out the tracking pulling-in of the optical pickup 3 when the rotation phase of the optical disk 1 is within the tracking pulling-in range.

With the configuration described above, it can increase the eccentric amount that enables maintaining the tracking even if the tracking actuator movable range is small. This makes it possible to implement a disk drive that has a high tracking maintenance capability for the optical disk 1 with an eccentric component and that improves the reproduction capability of the disk.

Incidentally, although the foregoing embodiment 1 shows a case where the eccentric amount detecting unit 10 detects the eccentric amount from the number of crossed tracks, the same advantage can be achieved even if it obtains the eccentric amount using a track crossing frequency.

In addition, although the foregoing embodiment 1 shows a case in which the eccentric amount detecting unit 10 detects the eccentric amount from the track crossing signal, the same advantages can be achieved by obtaining the eccentric amount from the tracking pulling-in timing signal c shown in FIG. 2(b) or from a disk read signal (RF signal) or the like.

Furthermore, as for an error of calculation produced when the eccentric amount detecting unit 10 obtains the average eccentric amount in the foregoing embodiment 1, it can be reduced by increasing the number of divisions n for one round of the disk rotation. In addition, setting the tracking pulling-in range by considering the error enables maintaining more stable tracking.

Embodiment 2

In the foregoing embodiment 1, the tracking pulling-in range is set in such a manner that the lens shift amount after the tracking pulling-in of the object lens does not exceed the movable range ±B of the tracking actuator. However, depending on the characteristics of the optical pickup, there are some cases where the quality of the servo signal or read signal can deteriorate as the lens shift amount increases, even if it is within the movable range of the tracking actuator.

Figure 13:
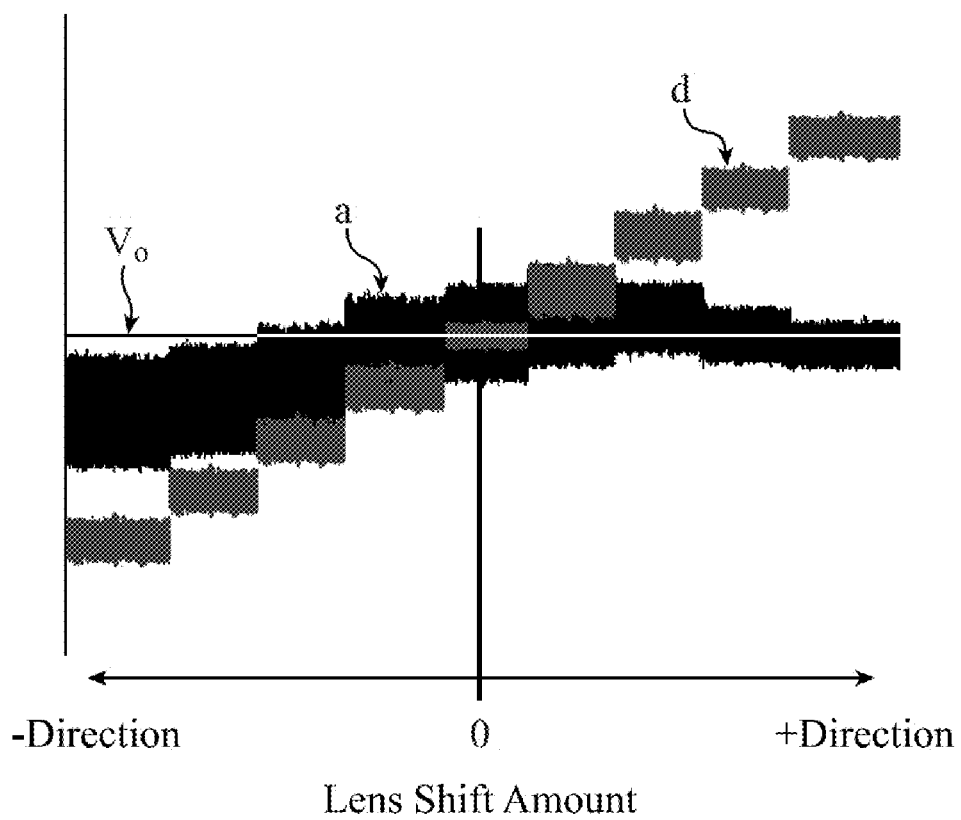
FIG. 13 is a diagram showing relationships between the lens shift amount of an optical pickup and a TE signal.

FIG. 13 is a diagram showing relationships between the lens shift amount of the optical pickup and the TE signal in the embodiment 2, in which an actually measured value designated by a symbol a is the TE signal and an actually measured value designated by a symbol d is the tracking drive signal. As shown in FIG. 13, as the lens shift amount increases, the balance of the TE signal a with respect to the reference voltage Vo varies, and when the lens shift increases in the plus direction, the amplitude of the TE signal a reduces considerably. In this case, the quality of the TE signal a deteriorates, and desired functions of the tracking servo control cannot be satisfied.

In the foregoing embodiment 1, it is conceivable that the optical pickup such as that described above cannot maintain the tracking because of fluctuations in the TE signal a even if it is within the movable range of the tracking actuator, thereby reducing the reproduction capability.

Accordingly, in the present embodiment 2, the tracking pulling-in range is set in such a manner as not to exceed the lens shift amount range that will enable a servo-control signal or read signal to maintain its quality for satisfying the desired functions. For example, as shown in FIG. 13, as the tracking pulling-in range is set the rotation phase range which corresponds to a lens shift amount range in which the variation of the balance of the TE signal a, which is the servo-control signal, with respect to the reference voltage Vo is small (the lens shift amount range in a neighborhood of the position at which the lens shift amount is zero, in which the level variation of the TE signal a is small). Incidentally, in this case, it is not always necessary to set the tracking pulling-in range centering on the position where the lens shift amount is zero.

In addition, as for the read signal from the optical disk 1, as the tracking pulling-in range is set the rotation phase range which corresponds to the lens shift amount range in which the variation of the amplitude with respect to a prescribed reference value of the read signal is small.

As described above, according to the present embodiment 2, it sets as the tracking pulling-in range the rotation phase range in such a manner as not to exceed the lens shift amount range that will enable the servo-control signal or read signal to maintain its quality for satisfying the desired functions, that is, as not to exceed the lens shift amount range that will enable the servo-control signal or read signal to retain its variation with respect to the reference value within an allowable range.

By thus doing, even as for the optical pickup with characteristics of deteriorating the quality of the servo-control signal or read signal as the lens shift amount of the object lens increases, the present embodiment 2 can set the tracking pulling-in range without deteriorating the quality of the signal.

Embodiment 3

As described above, the tracking pulling-in is achieved, for example, by controlling in such a manner as to close the servo loop when the tracking pulling-in timing signal c is in a track-on state and to open the servo loop when it is in a track-off state.

In addition, since there is a possibility conventionally that the pulling-in can fail if the track crossing speed of the laser spot is high at the tracking pulling-in, there are some cases which employ a tracking brake for carrying out drive control of the tracking actuator in such a manner as to reduce the track crossing speed by detecting the direction in which the laser spot crosses the tracks immediately before the tracking pulling-in.

In these operations, the tracking actuator moves the object lens from the central position, that is, causes the lens shift to occur. Consequently, when the lens shift amount is large, a case can occur which cannot maintain the tracking when applying the foregoing embodiment 1 or the foregoing embodiment 2. The phenomenon will be described in more detail below.

Figure 14:
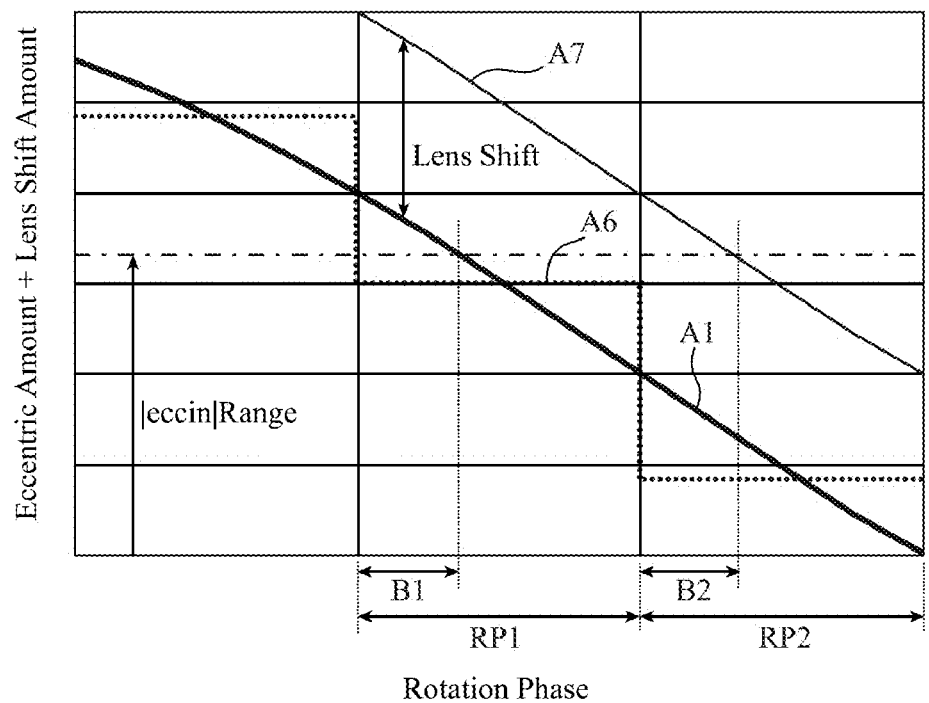

FIG. 14 is a diagram which adds to FIG. 12 relationships between the eccentric amount and average eccentric amount with respect to the rotation phase when the lens shift occurs at the tracking pulling-in. In FIG. 14, the thick solid line shows the eccentric amount A1, the thin solid line shows the sum A7 of the eccentric amount and the lens shift amount when the lens shift occurs, the broken line shows the average eccentric amount A6 and the dash dotted line shows the range of the absolute value |eccin| of the eccentric amount at the tracking pulling-in. As shown in FIG. 14, although the average eccentric amount in the disk rotation phase RP1 is the maximum average eccentric amount within |eccin|, the eccentric amount exceeds |eccin| in the angle range B1 even if it is placed within the range of the rotation phase RP1.

In the foregoing embodiment 1, when obtaining the |eccin| range, the tracking pulling-in range setting unit 11 sets, as the tracking pulling-in range, to the tracking control unit 7, the range of the disk rotation phase RP2, which corresponds to the storage area, the storage area number of which is less by one with respect to the resultant |eccin| range in the storage unit 12.

However, if the lens shift occurs at the tracking pulling-in as shown in FIG. 14, the sum A7 of the eccentric amount and the lens shift amount when the lens shift occurs exceeds |eccin| in an angle range B2. Accordingly, the lens shift amount after the tracking pulling-in exceeds the desired movable range of the tracking actuator.

Considering this, the present embodiment 3 calculates the disk rotation phase range corresponding to the lens shift amount at the tracking pulling-in and sets the tracking pulling-in range.

Figure 15:
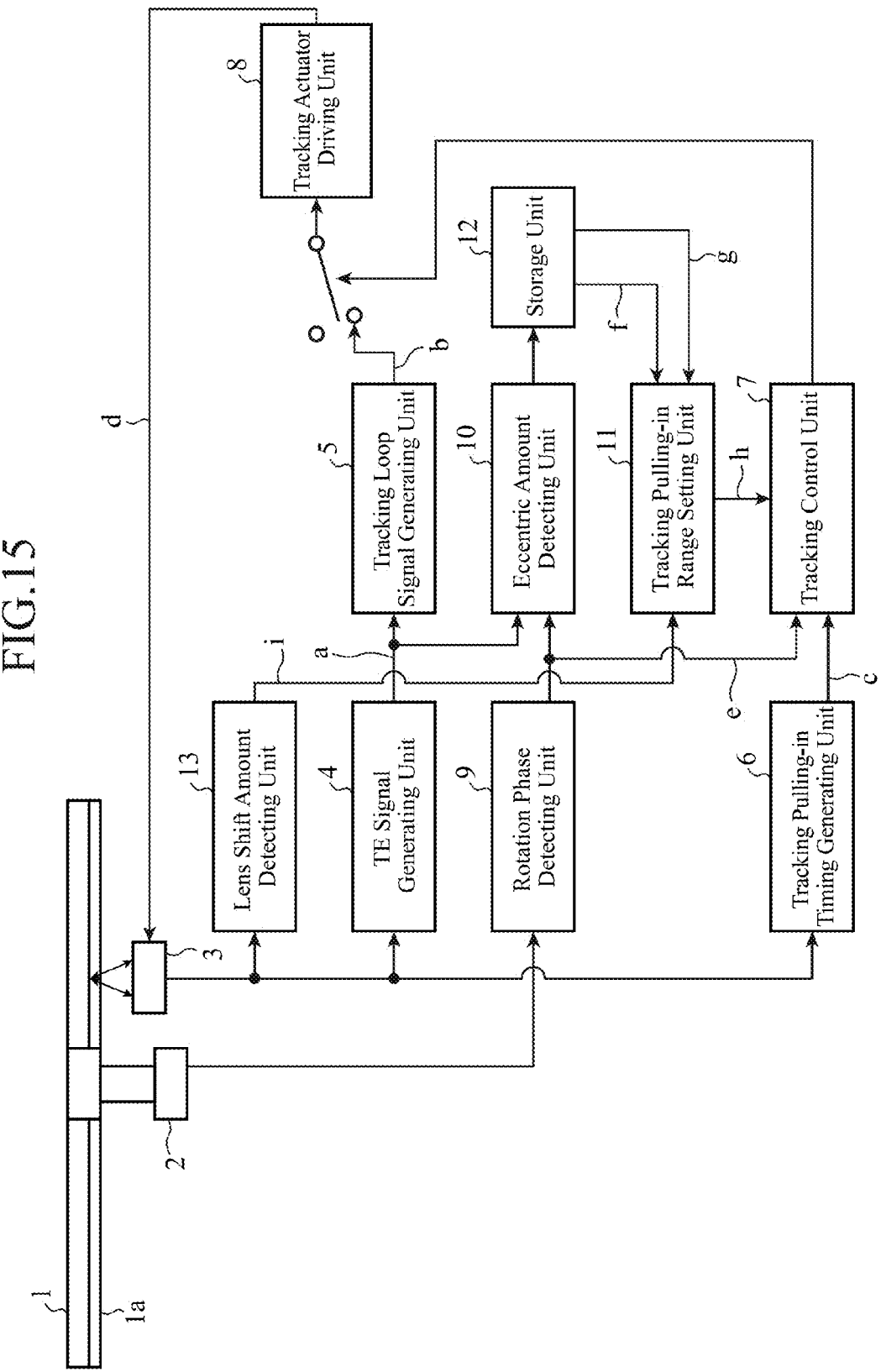
FIG. 15 is a block diagram showing a configuration of a disk drive of an embodiment 3 in accordance with the present invention.

FIG. 15 is a block diagram showing a configuration of the disk drive of the embodiment 3 in accordance with the present invention. In FIG. 15, as compared with the configuration shown in FIG. 1, the disk drive of the embodiment 3 differs from the foregoing embodiment 1 in that it further comprises a lens shift amount detecting unit 13 that supplies the tracking pulling-in range setting unit 11 with a lens shift amount signal i. Incidentally, the lens shift amount signal i is a signal indicating the lens shift amount the lens shift amount detecting unit 13 detects.

In the foregoing embodiment 1, the lens shift amount after the tracking pulling-in is given by ls=A×sin(ωt)−eccin where A is the maximum eccentric amount and eccin is the eccentric amount at the tracking pulling-in, and the disk rotation phase range is calculated using A+|eccin| as its maximum value. This holds when the lens shift does not occur during the tracking pulling-in.

In contrast with this, in the embodiment 3, the lens shift amount detecting unit 13 detects the lens shift amount lsin occurring in the tracking pulling-in, and supplies it to the tracking pulling-in range setting unit 11 as the lens shift amount signal i.

Recognizing the occurrence of the lens shift with the lens shift amount lsin in response to the lens shift amount signal i received, the tracking pulling-in range setting unit 11 obtains the lens shift amount is after the tracking pulling-in using ls=A×sin(ωt)−(eccin+lsin), and its maximum value is given by A+|eccin+lsin|. After that, in the same manner as the foregoing embodiment 1, it can calculate the disk rotation phase range corresponding to the lens shift amount at the tracking pulling-in and set the tracking pulling-in range.

As described above, according to the present embodiment 3, it comprises the lens shift amount detecting unit 13 for detecting the lens shift amount of the object lens of the optical pickup, and the tracking pulling-in range setting unit 11 sets, for each lens shift amount detected by the lens shift amount detecting unit 13, the rotation phase range in which the tracking pulling-in is made. By thus doing, it can increase the eccentric amount that enables maintaining the tracking even in the disk drive that has a lens shift occurring at the tracking pulling-in.

Incidentally, in the foregoing embodiment 3, if the lens shift amount occurring at the tracking pulling-in is negligibly small or if a disk rotation phase range is set narrow assuming the lens shift amount that will occur, it is enough to employ the configuration of the foregoing embodiment 1, and the lens shift amount detecting unit 13 can be omitted.

Embodiment 4

Involved in high-speed driving of disk drives recently, unbalanced vibration increases and an object lens vibration amount at the tracking pulling-in increases. Since the vibration of the object lens occurs owing to the disk rotation, the vibration frequency is often close to the rotation frequency. However, this does not always mean that the vibration phase is in synchronism with rotation phase.

As described from the foregoing embodiment 1 to the foregoing embodiment 3, if lens vibration occurs when measuring the eccentric amount of the optical disk 1, the measurement includes a lens vibration amount.

For example, when rotating a disk with the maximum eccentric amount A at the angular velocity ω, and assuming that the lens vibration maximum amount is C and the difference between the vibration phase and rotation phase is φ, the position y of the laser spot at time t when it crosses tracks on a disk is given by the following expression (A).

$$y = A\sin(\omega t) + C\sin(\omega t + \phi) \quad (A)$$

$$= ((A + C\cos\phi)^2 + C^2\sin^2\phi)^{1/2} \times \sin(\omega t + \phi)$$

where, $\phi = \tan^{-1}(C \sin \phi/(A+C \cos \phi))$

Thus, as compared with the original eccentric amount, the eccentric amount measured when the lens vibration is added differs in its amplitude and phase. Accordingly, after the tracking pulling-in, the lens vibration is suppressed by the tracking servo loop, and the lens shift amount corresponding to the eccentric amount occurs. Consequently, if the tracking pulling-in range is calculated from the eccentric amount measured in the state where the lens vibration is added, the tracking maintaining range becomes too narrow.

Accordingly, in the present embodiment 4, the object lens is maintained at the neutral position so as to drive and control the tracking actuator in such a manner that the object lens does not vibrate even in the condition in which the lens vibration occurs.

Figure 16:
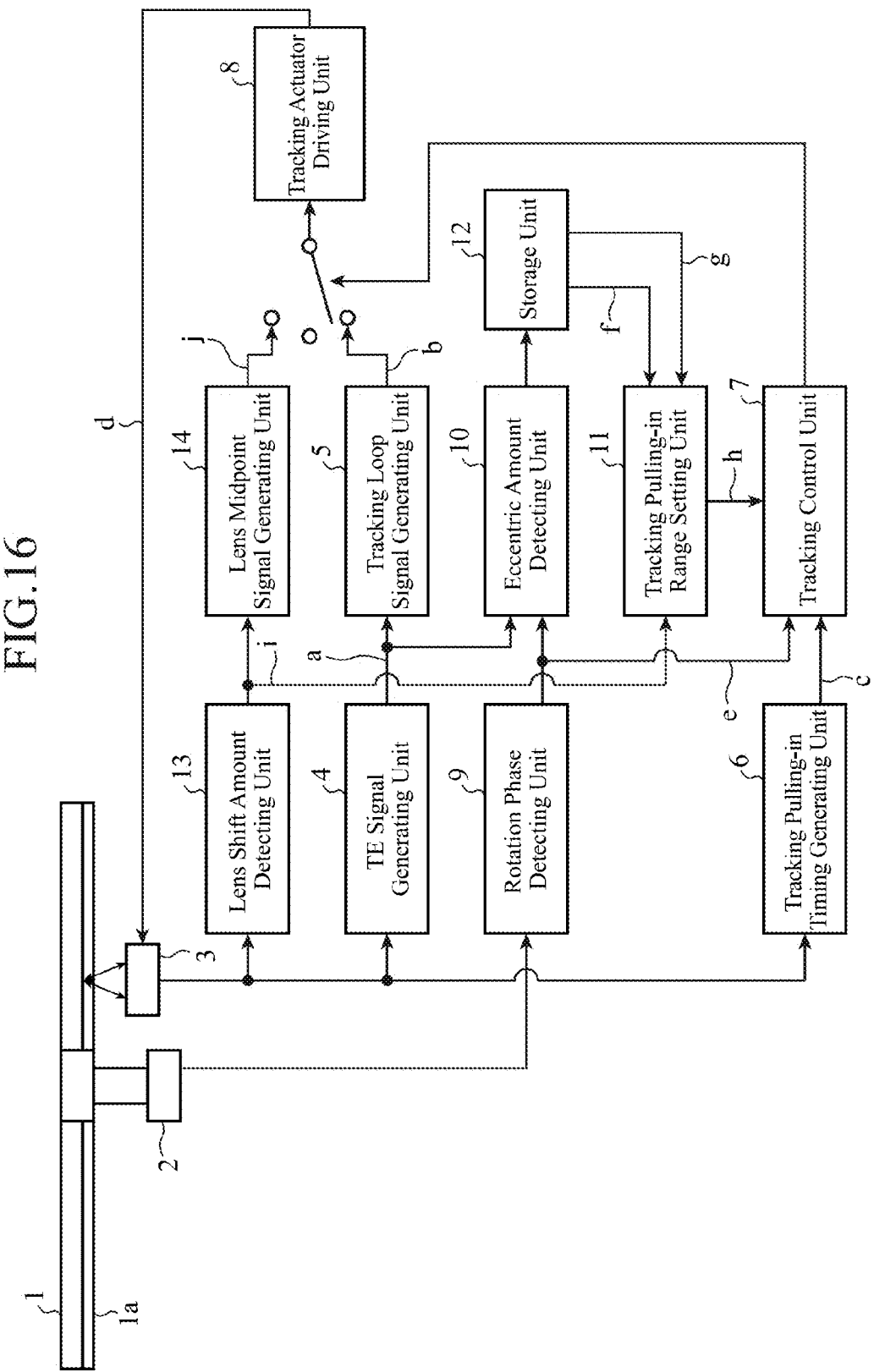
FIG. 16 is a block diagram showing a configuration of a disk drive of an embodiment 4 in accordance with the present invention.

FIG. 16 is a block diagram showing a configuration of the disk drive of the embodiment 4 in accordance with the present invention. In FIG. 16, the disk drive of the embodiment 4 differs from the foregoing embodiment 3 with the configuration shown in FIG. 15 in that it further comprises a lens midpoint signal generating unit 14 and that the tracking drive signal d can be switched to a lens midpoint signal j by the control of the tracking control unit 7.

The lens midpoint signal generating unit 14 is a component for generating a signal for suppressing the lens shift from the lens shift amount signal i. To suppress the lens shift, it outputs the lens midpoint signal j for maintaining the object lens at the midpoint. The object lens is maintained at the midpoint by controlling the tracking actuator driving unit 8 using the lens midpoint signal j and thus driving the tracking actuator. This makes is possible to prevent the vibration of the object lens from occurring even in the condition in which the lens vibration can occur.

As described above, according to the present embodiment 4, it comprises the lens midpoint signal generating unit 14 for generating the lens midpoint signal j for controlling the tracking actuator in such a manner as to make zero the lens shift amount of the object lens detected with the lens shift amount detecting unit 13, and causes the tracking control unit 7 to operate, when the eccentric amount detecting unit 10 detects the eccentric amount of the optical disk 1, in such a manner as to make zero the lens shift amount of the object lens by controlling the drive of the tracking actuator using the lens midpoint signal j the lens midpoint signal generating unit 14 creates.

In this way, since the present embodiment 4 is configured in such a manner that the tracking control unit 7 switches the tracking drive signal d to the lens midpoint signal j when measuring the eccentric amount, it can measure the eccentric amount at the same precision as the foregoing embodiments 1-3 even in the condition in which the lens vibration can occur, thereby being able to increase the eccentric amount that enables maintaining the tracking.

INDUSTRIAL APPLICABILITY

A disk drive in accordance with the present invention has a high tracking maintenance capability for a disk with an eccentric component and is able to improve the reproduction capability. Accordingly, it is suitable for applications to an onboard disk drive used in an environment where the object lens vibration amount is large.

What is claimed is:

1. A disk drive for performing servo control of tracking of an optical pickup on an optical disk, the disk drive comprising:
   a rotation phase detecting unit for detecting a rotation phase of the optical disk;
   an eccentric amount detecting unit for detecting an eccentric amount of the optical disk for each prescribed rotation phase detected by the rotation phase detecting unit;
   a storage unit for storing, for individual prescribed rotation phases, the eccentric amounts for one round of the optical disk detected by the eccentric amount detecting unit;
   a setting unit for determining, from the eccentric amounts for individual prescribed rotation phases for one round of the optical disk read out of the storage unit, a rotation phase range in which a lens shift amount after tracking pulling-in of an object lens constituting the optical pickup does not exceed a movable range of the object lens in a preset tracking direction, and for setting the rotation phase range as a tracking pulling-in range; and
   a control unit for carrying out tracking pulling-in of the optical pickup while the rotation phase of the optical disk detected by the rotation phase detecting unit is placed within the tracking pulling-in range set by the setting unit, wherein
   the disk drive can maximize pulling-in capability for eccentricity even in initial tracking pulling-in.

2. The disk drive according to claim 1, wherein
   the setting unit sets, as the tracking pulling-in range, a rotation phase range in which the lens shift amount after the tracking pulling-in of the object lens does not exceed a lens shift amount range in which a variation of a servo-control signal or read signal with respect to a prescribed reference value is within an allowable range.

3. The disk drive according to claim 1, further comprising:
   a shift amount detecting unit for detecting the lens shift amount of the object lens of the optical pickup, wherein
   the setting unit sets the rotation phase range for carrying out the tracking pulling-in for each lens shift amount detected by the shift amount detecting unit.

4. The disk drive according to claim 3, further comprising:
   a lens midpoint signal generating unit for generating a control signal for controlling a drive unit of the object lens in a manner as to make zero the lens shift amount of the object lens detected by the shift amount detecting unit, wherein
   the control unit controls, when the eccentric amount detecting unit detects the eccentric amount of the optical disk, operation of the drive unit with the control signal the lens midpoint signal generating unit creates, thereby causing the drive unit to operate in a manner as to make zero the lens shift amount of the object lens.

* * * * *

UNITED STATES PATENT AND TRADEMARK OFFICE
CERTIFICATE OF CORRECTION

PATENT NO. : 8,363,518 B2
APPLICATION NO. : 13/574539
DATED : January 29, 2013
INVENTOR(S) : Hiroshi Hoshino et al.

It is certified that error appears in the above-identified patent and that said Letters Patent is hereby corrected as shown below:

ON THE TITLE PAGE:

At item (73), Assignee, change:

"(73)   Assignee:      Mitsubishi Electric Corp., Tokyo (JP)"

to

--(73)   Assignee:      Mitsubishi Electric Corporation, Tokyo (JP)--.

Signed and Sealed this
Twenty-third Day of July, 2013

Teresa Stanek Rea
*Acting Director of the United States Patent and Trademark Office*